Jan. 24, 1961   J. R. MURRAY   2,969,258
OVERSHOE ATTACHMENT FOR TRACK LAYING VEHICLES
Filed July 11, 1958
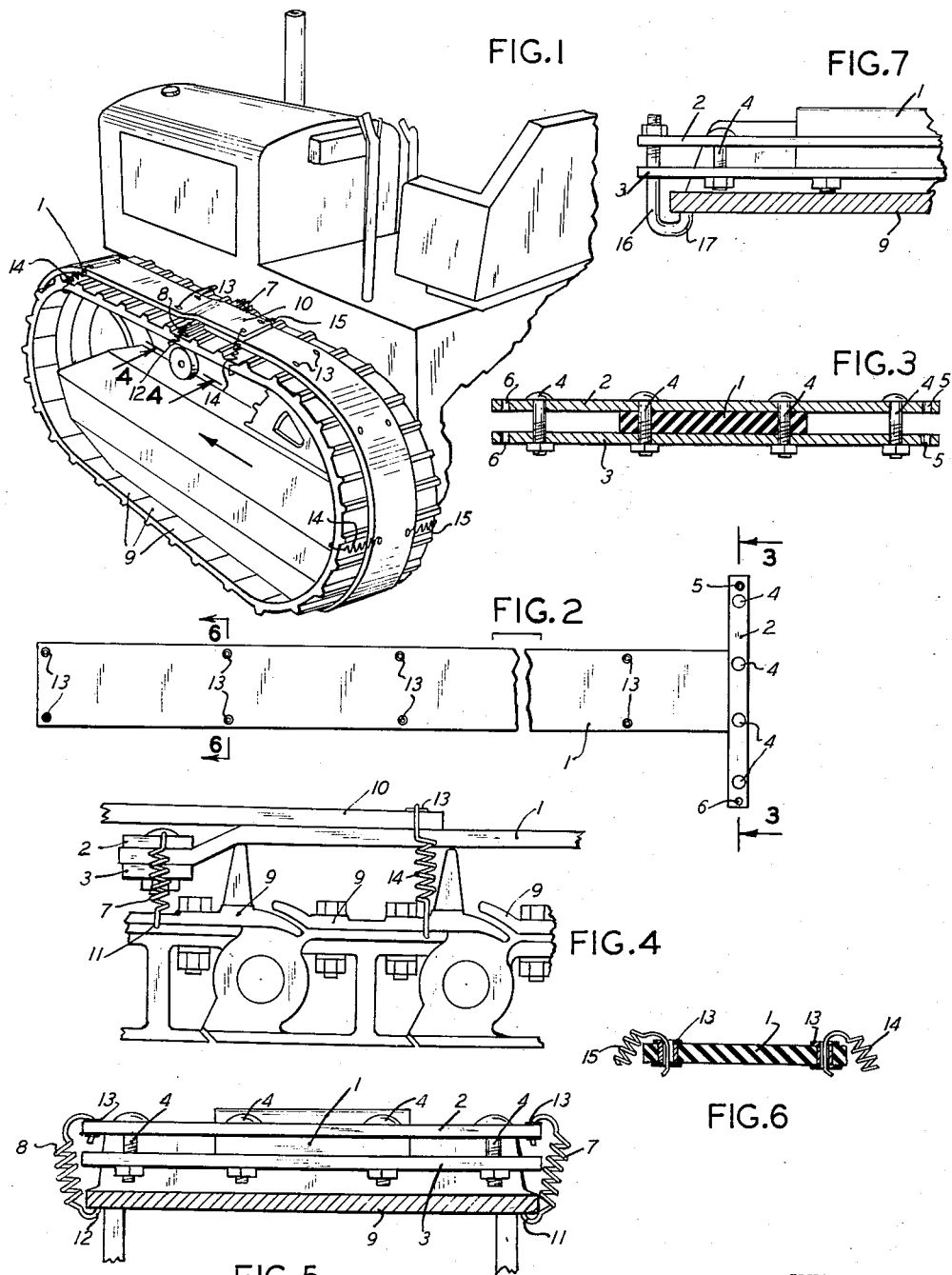
INVENTOR.
JOHN R. MURRAY
BY
Samuel Jacobson
ATTORNEY

United States Patent Office 2,969,258
Patented Jan. 24, 1961

2,969,258

OVERSHOE ATTACHMENT FOR TRACK LAYING VEHICLES

John R. Murray, Rte. 1, Maupin, Oreg.

Filed July 11, 1958, Ser. No. 747,920

8 Claims. (Cl. 305—35)

In its broadest aspect this invention relates to the problem of protecting highways from possible damage caused by vehicles equipped with metallic crawler or wheel-tread type traction. The invention is specifically related to means for temporarily covering the metallic crawlers or treads with which tractors or other types of farm machinery and similar types of vehicles are equipped while traveling highways.

Because of the disastrous effects upon modern highways caused by heavy types of vehicles used on farms and on construction jobs and equipped with unprotected crawler or wheel-tread type traction when traveling on these highways, most states specifically prohibit the operation of any vehicle equipped with any tire, or other traction means, which has on its periphery any block, stud, cleat, bead, chain, or other protuberance of metal projecting beyond the tread or traction surface of the tire or other traction means.

While some states do permit a landowner or lessee of land adjacent to a highway to move across or along said highway any tractor or implement of husbandry not equipped with pneumatic tires, nevertheless, even in these states, such landowner or lessee is subject to liability for any damage or injury to the highway caused by such movement.

Consequently, to move such equipment over modern highways, it is essential to provide some means for protecting the highway, when these vehicles are not equipped with pneumatic tires, in order to avoid violation of the law and liability for damaging or injuring the highway by the movement of such vehicle across or upon the highway without such protection.

Attempts to meet this problem and provide road protectors for tractors and like vehicles have been made previously but the prior efforts have either been inadequate or resulted in such complicated construction or was so expensive and difficult to apply that their usefulness was either destroyed or their effectiveness was of doubtful value.

The quintessence of my invention is to provide a road protecting device for tractors and like vehicles which overcome the disadvantages inherent in present types of road protectors and this is acomplished by providing a relatively inexpensive but effective road protecting device of such simple construction as to facilitate its secure attachment on the traction elements with the expenditure of a minimum of time and effort and its expeditious removal with equal facility.

A further object of my invention is to provide a belt, treaded or smooth, which extends around the endless track of a tractor or a like vehicle in such manner that it is laid down as the tractor or like vehicle moves forward to provide a continuous protective surface for the track plates or wheel-tread of the tractor or like vehicle and thus preventing them from contacting the highway during the movement of such vehicle upon or across the highway.

These and other objects and features of my invention will more fully become evident from the following description and the accompanying drawing in which the preferred embodiment of the invention is illustrated and, in which:

Fig. 1 is a perspective view of a fragmentary but fancifully represented vehicle applicable to all types of vehicles having any type of metallic traction and showing a crawler type of traction element over which the overshoe or belt embodying the principles of my invention is positioned;

Fig. 2 is a top plan view of the belt embodying the principles of my invention;

Fig. 3 is a sectional elevation, taken on line 3—3 of Fig. 2 looking in the direction indicated, to more clearly illustrate some of the structural charcteristics of my invention;

Fig. 4 is a fragmentary side elevation, taken on line 4—4 of Fig. 1 looking in the direction indicated, showing more graphically the means for attaching the overshoe or belt to the track plates of the endless track illustrated:

Fig. 5 is a transverse section showing the preferred manner of ataching the belt to the tracks of the vehicle;

Fig. 6 is a transverse section of the invention, taken on line 6—6 of Fig. 2 looking in the direction indicated; and Fig. 7 is a fragmentary transverse section to illustrate another means for attaching the belt to the tracks of a vehicle.

The word "tractor" will be employed in this specification as a generic term applicable to all types of vehicles the traction for which is provided by endless chains of metal plates passing over sprockets, or by wheels formed of endless circles of metal treads.

The vehicles to which my invention may be applied are fancifully represented in Fig. 1 of the drawing revealing only one side and therefore showing only one endless track. It is, of course, obvious that the vehicle has an identical endless track on the side not shown in the drawing. An overshoe belt having the same structural characteristics as the one shown in the drawing is also used with the endless track not shown. Furthermore, these overshoe belts operate just as effectively on wheel tread type of traction elements. Consequenty, the description which follows of the overshoe belt shown, pertains equally as well to the overshoe belt not shown in the drawing and to overshoe belts which might be employed on wheel tread type of traction elements.

An overshoe belt 1, made of any suitable material such as a fabric impregnated with rubber, plastic, or any other material resulting in a nonstretchable thick flexible belt which may be reinforced if desired, is securely confined between anchor bars 2 and 3 positioned in transverse relation thereto by any desirable means, as by common nuts and bolts 4. Anchor bars 2 and 3 may be incased in a layer of cushioning material such as rubber or plastic thereby insuring against the possibility of the anchor bars damaging the highway during the movement of the vehicle upon and across the highway. Openings 5 and 6 are provided near the end of each of anchor bars 2 and 3 for engagement by a pair of heavy duty resilient elements, such as coil springs 7 and 8. Resilient elements 7 and 8 are removably secured alongside the track plates, as shown at 11 and 12.

The length of overshoe belt 1 is more than sufficient to cover the endless track of any vehicle and is more than adequate to wrap around the tractional periphery of a plurality of flexible connected track plates 9 forming the endless track assembly of any vehicle such as a tractor as shown in Fig. 1. The trailing end 10 of overshoe belt 1 overlaps the rest of the belt when fully wrapped around the track and provides added protection against damage of the highway by the anchor bars 2 and 3. To reduce the weight and bulk of the overshoe belt 1, its width is less than the width of the endless tracks but is sufficiently wide to insure against the track plates contacting the highway as the vehicle moves thereon.

Pairs of metal lined but rubber covered eyelets 13 are disposed in spaced relationship along both edges of the overshoe belt 1 and heavy duty resilient members, such as coil springs 14 and 15 are yieldingly engageable to these eyelets and alongside the track plates 9 forming the endless track assembly in order to restrain the overshoe belt 1 from weaving and to prevent side slippage of the same during the movement of the vehicle.

In lieu of resilient elements 11 and 12, a pair of bolts 16 (only one of which is shown in Fig. 7), may be substituted. Bolts 16 are disposed in openings 5 and 6 and each has a hook 17 removably engageable to the track plates 9.

By this arrangement the overshoe belt 1 extends around the endless track assembly of the vehicle and as the vehicle moves in the direction shown by the arrow in Fig. 1 or in the opposite direction, the belt is progressively laid down to temporarily provide a cushioned support and cover for the track plates 9 enabling the vehicle to move over and across the highway without causing damage thereto.

To those skilled in the art to which this invention appertains, changes and modifications may come to mind which, however, do not depart from the scope and spirit of the invention. I, therefore, do not wish to be limited to the precise disclosures illustrated in the drawings and hereinabove described; having fully described the objects and nature of my invention, what I claim as novel and upon which I desire to secure Letters Patent is:

1. A highway protector for a vehicle having metallic traction means of a predetermined width and perimetric length adapted to cover said metallic traction means, comprising, a pair of flexible, inextensible cushioning belts, anchor bars removably secured to one end of each of said belts, a pair of coil springs secured to said anchor bars for removable engagement alongside the traction means of the vehicle, and a plurality of coil springs secured to each of said belts and removably secured alongside the traction means arranged to yieldingly resist side slippage of said belt when positioned on the traction means of said vehicle.

2. A highway protector for a crawler type tractor or similar vehicle having a pair of endless metallic traction means each of a pre-determined width and perimetric length comprising, a pair of relatively thick, flexible, inextensible non-metallic belts, a plurality of pairs of grommets formed adjacent the sides of each of said belts, means on one end of each of said belts for removably securing said belts to, and permit their placement about the periphery of the traction means of said vehicle, and means secured to each grommet for removably attaching the sides of each of said belts alongside said traction means to prevent the weaving and sidewise slippage of said belts.

3. A highway protector for a crawler type tractor or similar vehicle having a pair of endless metallic traction means each of a pre-determined width and perimetric length comprising, a pair of relatively thick, flexible, inextensible non-metallic belts, a plurality of pairs of grommets formed adjacent the sides of each of said belts, means on one end of each of said belts for removably securing said belts to, and permit their placement about the periphery of the traction means of said vehicle, and resilient means secured to each grommet for removably attaching the sides of each of said belts alongside the traction means to prevent the weaving and sidewise slippage of said belts.

4. A highway protector for a crawler type tractor or similar vehicle having a pair of endless metallic traction means each of pre-determined width and perimetric length comprising, a pair of relatively thick, flexible, inextensible non-metallic belts, a plurality of pairs of grommets formed adjacent the sides of each of said belts, means on one end of each of said belts for removably securing said belts to, and permit their placement about the periphery of the traction means of said vehicle, and a coil spring secured to each grommet for removably attaching the sides of each of said belts alongside the traction means to prevent the weaving and sidewise slippage of said belts.

5. A highway protector for a crawler type tractor or similar vehicle having a pair of endless metallic traction means each of a pre-determined width and perimetric length comprising, a pair of relatively thick, flexible, inextensible non-metallic belts, anchor bars secured to one end of each of said belts, means secured to said anchor bars for removable engagement alongside the traction means, and a plurality of resilient members attachable to each belt and removably secured alongside said traction means arranged to yieldingly resist side slippage of said belts when positioned on the periphery of said traction means of said vehicle.

6. A highway protector for a vehicle having metallic traction means of a pre-determined width and perimetric length adapted to cover said metallic traction means, comprising a pair of flexible, non-metallic belts, anchor bars secured to one end of each of said belts, means secured to said anchor bars for removable engagement alongside said traction means of the vehicle, pairs of grommets spaced on the sides of each belt and a plurality of resilient members attached to said grommets and removably secured alongside said traction means.

7. A highway protector for a vehicle having metallic traction means of a pre-determined width and perimetric length adapted to cover said metallic traction means, a pair of relatively thick, flexible, inextensible, non-metallic belts, a plurality of parallelly spaced pairs of grommets formed adjacent the sides of each belt, means secured to each grommet for removably attaching the sides of each belt to prevent weaving and sidewise slippage of said belts, and means for removably securing each of said belts to said traction means and permit their placement and retention upon the periphery of their respective traction means.

8. In combination with the traction means of a crawler type tractor or similar vehicle, a highway protector adapted to temporarily cover the metallic traction means of said vehicle comprising, a pair of flexible, inextensible non-metallic belts, anchor bars secured to one end of each of said belts, resilient members secured to said anchor bars for their removable engagement to said traction means, to thereby hold each of said belts about the said traction means, and a plurality of resilient members secured to said belts and removably attachable alongside the traction means arranged to resist side slippage of said belts when positioned upon said traction means.

References Cited in the file of this patent

UNITED STATES PATENTS

| 1,438,859 | Rimailho | Dec. 12, 1922 |
| 2,369,130 | Benson | Feb. 13, 1945 |

FOREIGN PATENTS

| 97,243 | Austria | June 10, 1924 |
| 633,716 | Germany | Aug. 5, 1936 |
| 759,955 | Great Britain | Oct. 24, 1956 |